United States Patent [19]

Ackland et al.

[11] Patent Number: 5,541,402
[45] Date of Patent: Jul. 30, 1996

[54] IMAGING ACTIVE PIXEL DEVICE HAVING A NON-DESTRUCTIVE READ-OUT GATE

[75] Inventors: Bryan D. Ackland, Old Bridge; Alexander G. Dickinson, Neptune; El-Sayed I. Eid, Freehold; David A. Inglis, Long Branch, all of N.J.

[73] Assignee: AT&T Corp., Murray Hill, N.J.

[21] Appl. No.: 323,945

[22] Filed: Oct. 17, 1994

[51] Int. Cl.$^6$ ................................................ H01J 40/14
[52] U.S. Cl. .................................. 250/208.1; 257/239
[58] Field of Search .................... 250/208.1, 214 LA, 250/214 C, 214.1; 257/239, 225, 236, 231; 358/443, 445, 447, 448; 377/58, 117; 348/294, 297

[56] References Cited

U.S. PATENT DOCUMENTS

| | | | |
|---|---|---|---|
| 4,011,442 | 3/1977 | Engeler | 257/231 |
| 4,716,466 | 12/1987 | Miida et al. | 257/239 |
| 4,873,436 | 10/1989 | Kamieniecki et al. | 250/315.3 |
| 5,175,805 | 12/1992 | Carrie | 395/122 |
| 5,287,393 | 2/1994 | Miwada | 377/60 |
| 5,324,958 | 6/1994 | Mead et al. | 257/291 |

*Primary Examiner*—Que T. Le

[57] ABSTRACT

The imaging pixel according to the present invention includes a floating gate pixel node capable of nondestructive readout and active source follower output circuitry suitable for combination with other like imaging pixels to form an imaging array.

17 Claims, 3 Drawing Sheets

IMAGING ACTIVE PIXEL DEVICE HAVING A NON-DESTRUCTIVE READ-OUT GATE

BACKGROUND OF THE INVENTION

1. Field of the Invention

The present invention relates to an imaging pixel device and a method for generating a signal representing an image of an object. More particularly, the present invention relates to an imaging active pixel device having a nondestructive readout structure.

2. Description of Related Art

Imaging arrays are frequently used to produce an image representing an object. The imaging arrays are typically formed from rows and columns of photodetectors which generate photo-charges proportional to light reflected from the object to be imaged. The photo-charges from each pixel are converted to a signal (charge signal) or a potential representative of the level of energy reflected from a respective portion of the object and the signal or potential is read and processed by video processing circuitry to create the image.

The output nodes of pixels in the same column are usually commonly connected and each pixel in the column is individually controlled to read-out at the common output node. Although the common output node design affords ease of construction and control, it frequently suffers from noise and sensitivity problems, due largely from the capacitive effects of the common connection.

One technique used to improve the quality of the charge signal and thus the image is known as the Adaptive Integration Time ("AIT") technique, in which the read-out charge signal is compared to a predetermined quality criterion, and upon failure of such criterion, the process of charge generation and read-out is repeated to improve the charge signal until the criterion is met. With this technique, there may be repeated read-outs from the same pixel.

The AIT technique produces an improved image but more time is required to produce the image. Particularly, in pixels in which the photo-charges are diffused or lost during read-out, the charge generation and read-out time is further increased and the circuitry required for implementing the AIT technique is much more complex.

Therefore, there is a need for an imaging array which is made up of imaging active pixels which are capable of retaining the photo-charges after read-out and provide improved noise and sensitivity signal characteristics.

The imaging active pixel device and method according to the present invention accomplishes the above needs.

SUMMARY OF THE INVENTION

The imaging active pixel according to the present invention is capable of non-destructive read-out. The pixel comprises: a first charge collection device configured for collecting photo-charges at a level proportional to energy received from a portion of an object to be imaged; a second charge collection device, being operatively connected to the first charge collection device and configured for selectively receiving and collecting the photo-charges from the first charge collection device; and a gating device being operatively connected to the second charge collection device, for selectively reading the level of the photo-charges collected in the second charge collection device without destructing the collected photo-charges.

Preferably, the imaging pixel further includes circuitry for selectively transferring the collected charges between the first and second charge collection devices and the gating device includes transistors connected in a source follower format. The transistors are preferably CMOS.

The imaging pixel is intended to be connected to other like imaging pixels to form an imaging array. The output gating device is therefore configured to commonly connect to at least one other gating device of another like imaging pixel for reading out the charge signals.

The imaging pixel further includes a reverse-biased semiconductive junction which is operatively connected to at least one of the first and second charge signal collection devices for selectively discharging the collected photo-charges. The semiconductive junction may be buried and vertically disposed adjacent to at least one of the first and second charge collection devices. The buried semiconductive junction may be formed from an n-type substrate with a p-type epitaxial layer or from a p-type substrate with an n-type epitaxial layer.

The present invention is also directed to a method for imaging from an imaging active pixel, comprising the steps of: detecting energy reflected from an object to be imaged by a photo-detecting device; generating photo-charges in an amount corresponding to the detected energy; transferring the photo-charges to a read-out storage device; buffering the read-out storage device from an output gate; and outputting from the output gate a potential value corresponding to the amount of photo-charges stored in the read-out storage device.

The method may further include the steps of transferring the photo-charges to and from the photo-detecting device and the read-out storage device, and discharging the generated photo-charges with a reverse biased semiconductive junction. According to the method of the present invention, AIT imaging may be implemented with the further steps of comparing the potential to a predetermined potential criterion; transferring the photo-charges to the photo-detecting device upon failure of the criterion; further generating the photo-charges; transferring the further generated photo-charges to the read-out storage device; and outputting a potential corresponding to the further generated photo-charges. These steps are repeated until the predetermined criterion is met.

BRIEF DESCRIPTION OF THE DRAWINGS

The features and advantages of the present invention will be more apparent when the description is read in view of the drawings in which.

DETAILED DESCRIPTION OF THE PREFERRED EMBODIMENTS

The operation of a prior art diffusion node type imaging active pixel device is discussed with reference to FIG. 1. The device includes a photogate PG for detecting energy reflected from a portion of an object to be imaged and generates photo carriers below the gate in an amount proportional to the reflected energy. Upon selection of proper bias voltages, the photo carriers are transferred through channel gate TG to diffusion node FD, which connects to an output gate made up of transistors QA, QS and QL. The transistors are connected in an emitter follower format. The potential representative of the amount of charge collected in diffusion node FD is read at output node OUT. In operation, photo-charge carriers are generated and collected under the photo-gate (PG) during a predetermined integration period. Prior to the end of the integration period, the floating diffusion node FD is reset by pulsing the reset transistor QR. At the end of the integration period, photogate PG is pulsed and the photo-charges flow into the diffusion node FD. This causes the potential of node FD to change from its reset level to a level proportional to the amount of photo-charges collected at node FD (signal level). The difference between the reset and signal levels is proportional to the incident light intensity and constitutes the video signal.

The output gate of the imaging pixel is used to buffer the pixel node FD from the output node OUT, which may be commonly connected to a column of like imaging pixels within an imager pixel array. A select transistor QS is used to select the pixel for read-out. The photo-charge carriers collected at the diffusion node FD are substantially discharged upon activation of the output transistors QA, QS and QL during read-out.

Figure 1:
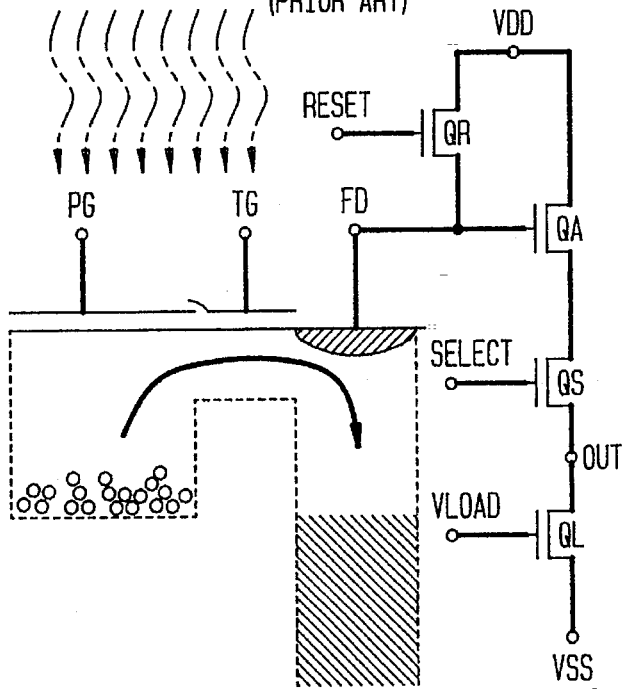
FIG. 1 illustrates a prior art imaging pixel.
Figure 2:
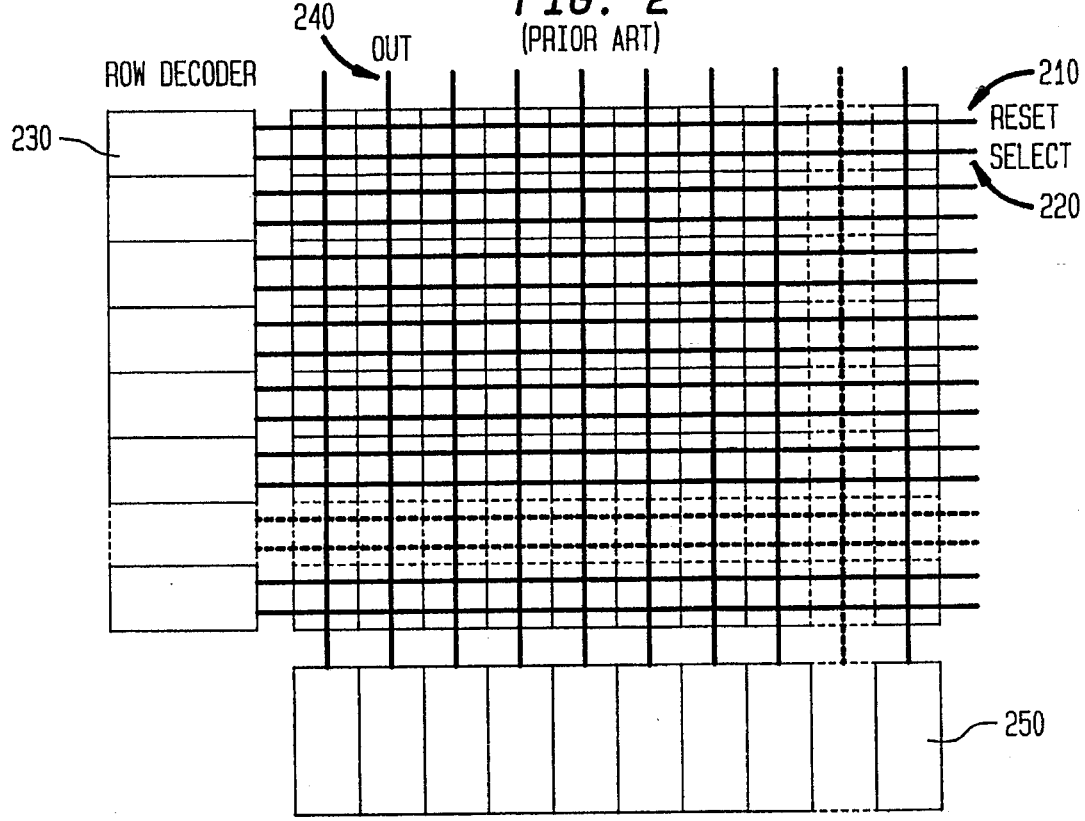
FIG. 2 illustrates an imaging array formed from rows and columns of imaging pixels as in FIG. 1.

An array formed by rows and columns of imaging pixels as in FIG. 1 is shown in FIG. 2. Row decoder 230 control horizontal reset 210 and select 220 lines, which commonly connect to the reset and select inputs of each imaging pixel of the same row to provide selective controls. The OUT 240 signal line commonly connects to all the OUT nodes of each imaging pixel in the same column. The OUT 240 lines carry pixel video outputs to amplifiers 250 for amplification prior to video processing circuit.

The active pixels can be either n-channel devices with electrons as the generated photo-charge carriers or p-channel devices with holes as the generated photo-charge carriers.

Figure 3:
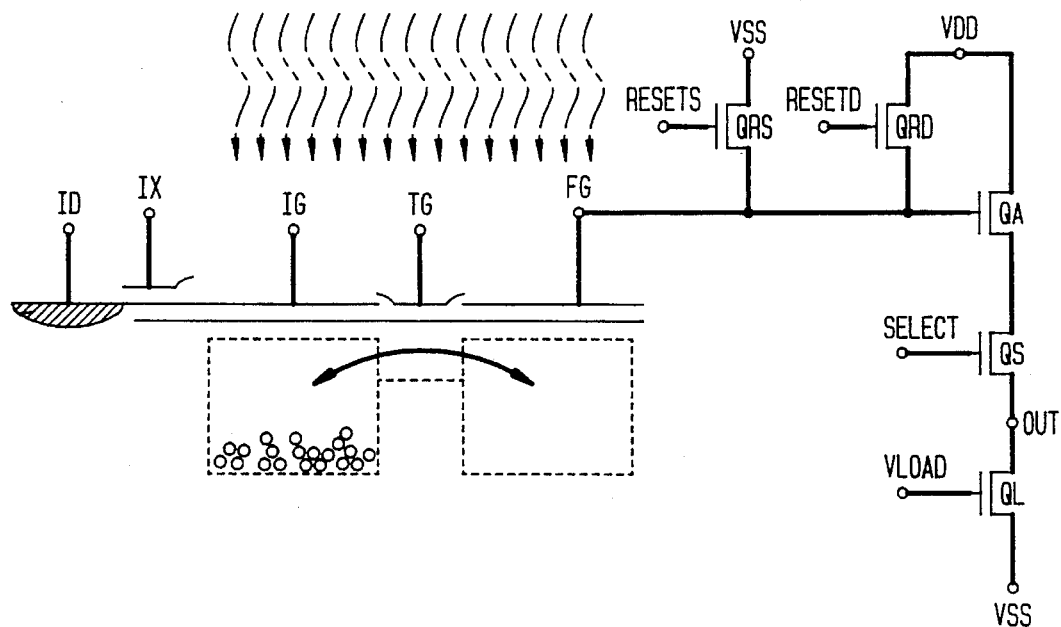
FIG. 3 illustrates an imaging active pixel according to the present invention.

FIG. 3 shows a preferred imaging active pixel according to the present invention. As shown, a floating gate FG replaces the floating diffusion node FD of the imaging pixel of FIG. 1, and two reset transistors QRS and QRD are employed to control the floating gate FG. The first reset transistor QRD is used to reset FG to VDD and the second reset transistor QRS is used to reset FG to VSS.

Advantageously, the imaging active pixel device according to the present embodiment employs a non-destructive read-out floating gate, i.e., the floating gate node FG is local to its pixel and is buffered from the read-out nodes within the imager pixel array, and the integrity of the photo-charge carriers under gate FG remains intact after read-out. Further, the photo-charge carriers may be selectively transferred to and from the first and second charge collection devices or collection means under gates IG and FG for repeated read-outs.

Generally, the operation of the imaging pixel according to the present embodiment has three phases. In the first phase (integration), the generated photo-charge carriers are collected under the integrating photogate IG for a predetermined integration period. In the second phase (read-out), the potential of the floating gate FG is read. In the third phase (injection), the generated photo-charge carriers are discharged.

Figure 4A:
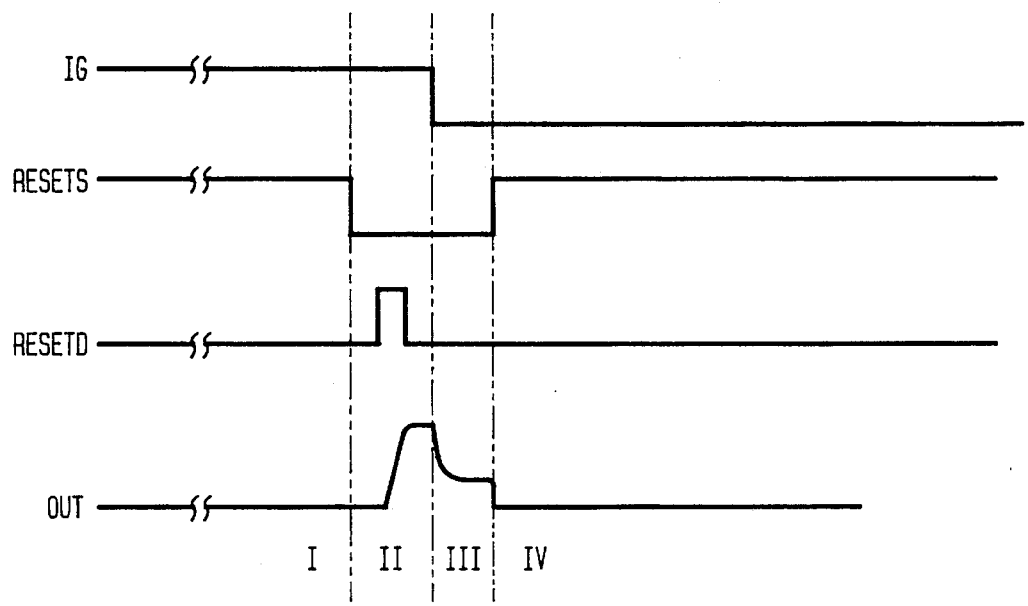
FIG. 4A and FIG. 4B illustrate timing diagrams of the imaging processes according to the present invention.

The operation of the imaging pixel as shown in FIG. 3 may be better understood with reference to the timing diagram of FIG. 4A. During phase I-integration, photogate IG is biased at a high voltage level, at around 4 volts. Floating gate FG is kept off by turning on transistor QRS with Reset S at high and transistor QRD turned off with Reset D at low so that node FG is approximately at VSS or 0 volt. In this phase I, and in the next two phases II and III, the transfer gate TG is dc biased to a voltage slightly higher than the threshold voltage of the photogates IG and FG, at around 1.0 volts, such that the transfer channel is slightly conducting. In this configuration, the photo-charge carriers generated by photogate IG are collected by storage means under IG and are prevented from spilling into gate FG.

After a predetermined integration time period, the imaging pixel enters the second phase of operation-read-out, in which QRS is turned off and QRD is pulsed on and off (as shown in time II of FIG. 4A.) This causes the potential of FG to be floating at a level approximately equal to VDD less the threshold voltage, at around 4 volts. Then, the bias of IG is changed to its low level (time III), at approximately VSS or 0 volts, causing the transfer of the photo-charge carriers (charge signal) to spill under gate FG. This charge signal transfer causes the potential of FG to change from its floating value (reset level) to another value (signal level). This potential deviation (i.e., the difference between the reset and signal levels) is proportional to the incident light intensity and therefore constitutes the video signal. During the read-out time period III, transistor QS may be turned on with a high bias at the Select input, the voltage level read at the OUT node is proportional to the video signal level at floating gate FG.

As in the floating diffusion pixel design of FIG. 1, the gating device is configured as a source-follower formed by an active transistor QA and a load transistor QL is used to buffer the floating gate or pixel node FG from the output node OUT. Preferably, the OUT node is intended to be commonly connected to a column of like imaging pixels within the imager pixel array. The transistors are preferably CMOS but may also be bipolar. In the latter case, the transistor configuration is called the emitter follower.

Advantageously, the source follower configuration and the location of the floating gate read-out node FG within the pixel significantly reduce the capacitance of the read-out node, resulting in improved charge signal sensitivity and noise characteristics. For example, for a 128×128 imager array, the reduction in the capacitance of the floating gate read-out node is four orders of magnitude compared to that of a design where the read-out node is common for all pixels within the imager array, and two orders of magnitude compared to that of a design where the read-out node is common for all pixels within a row or a column of the imager array. This reduction in read-out node capacitance is more for larger size imager arrays. A reduction of the read-out node capacitance results in a proportional increase in the read-out sensitivity and a reduction of the read out kTC noise by the square root of the capacitive reduction.

Further, the imaging pixel as configured in the present embodiment is capable of maintaining the integrity of the photo-charge carders under floating gate FG after read-out, i.e., the photo-charges are not diffused during read-out as would be in the device as shown in FIG. 1. Thus, the charge signal under gate FG can be transferred back to under photogate IG for further integration and then forth to under FG for a second read-out.

Figure 4B:
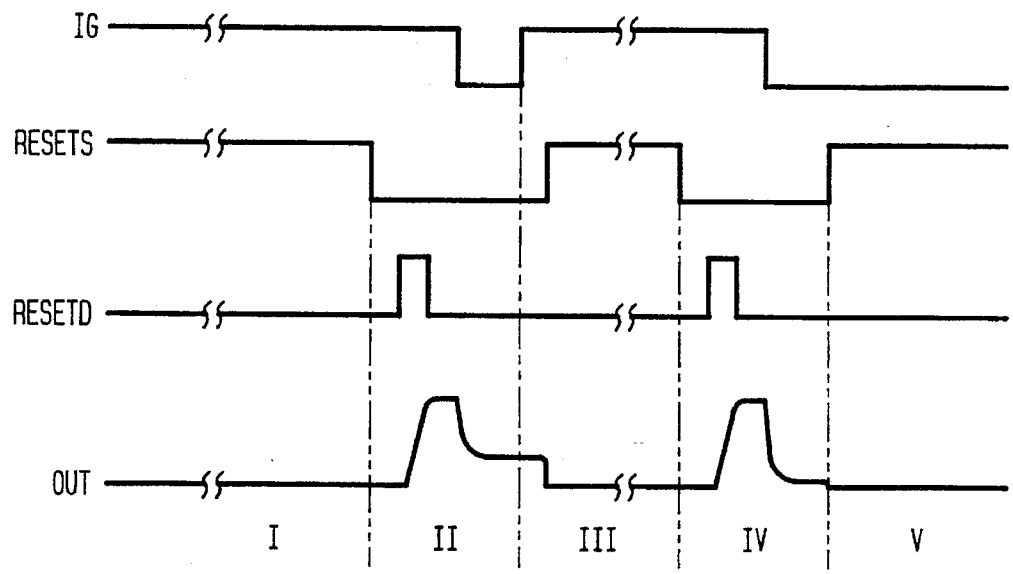

The repeat read-out process is explained with reference to FIG. 4b. The integration and first read-out is shown in time I and II. The process is as explained for time I and II of FIG.

4A. During time III, with IG biased high and FG biased to VSS or low, the photo-charges in the storage means under FG transfer back into under photogate IG. Further integration, if required, is also performed during time III. During time IV, the photo-charges collected under IG is transferred to under gate FG for a second read-out. The re-reading can be repeated for as many times as needed. This feature is particularly suitable for AIT imaging as previously described. It is apparent to one skilled in the art that the variable factors such as integrating time, bias levels and turn-on times may be adaptively adjusted to obtain the optimal charge signal during the AIT process.

In the injection phase of operation (time IV of FIG. 4A and time V of FIG. 4B) the charge signal is disposed of. This can be done by injecting the charge signal into a reverse-biased p-n junction. FIG. 3 shows an exemplary planar discharge device comprising a diode ID and control gate IX. The charge signal injection takes place when IG is biased to approximately VSS or 0 volt, and turning QRD off and QRS on such that FG is approximately VSS or 0 volt. The gate IX is biased to conduct at slightly higher than threshold voltage, at around 1.0 volt and the diode ID is reversed biased at around 5.0 volts. In such configuration, the charge carriers are injected into the diode ID from under the photogate IG. Alternately, the reverse-biased p-n junction can be a buried (vertical) one, such as a charge injection device (CID). In the buried junction case (not shown), the substrate material on which the active pixel is built should be of opposite type to that of the epitaxial layer. For example, an n-channel active pixel is fabricated using a starting material of a p-type epitaxial layer on an n+type substrate and a p-channel active pixel has an n-type epitaxial layer on a p-type substrate.

The injection reverse-biased p-n junction, whether buried or planar, serves also as an anti-blooming structure. The excess charge carriers (excess of saturation) will be drawn by this reverse-biased p-n junction, instead of spilling over into neighboring pixels. This anti-blooming protection is achieved at no additional cost.

Figure 5:
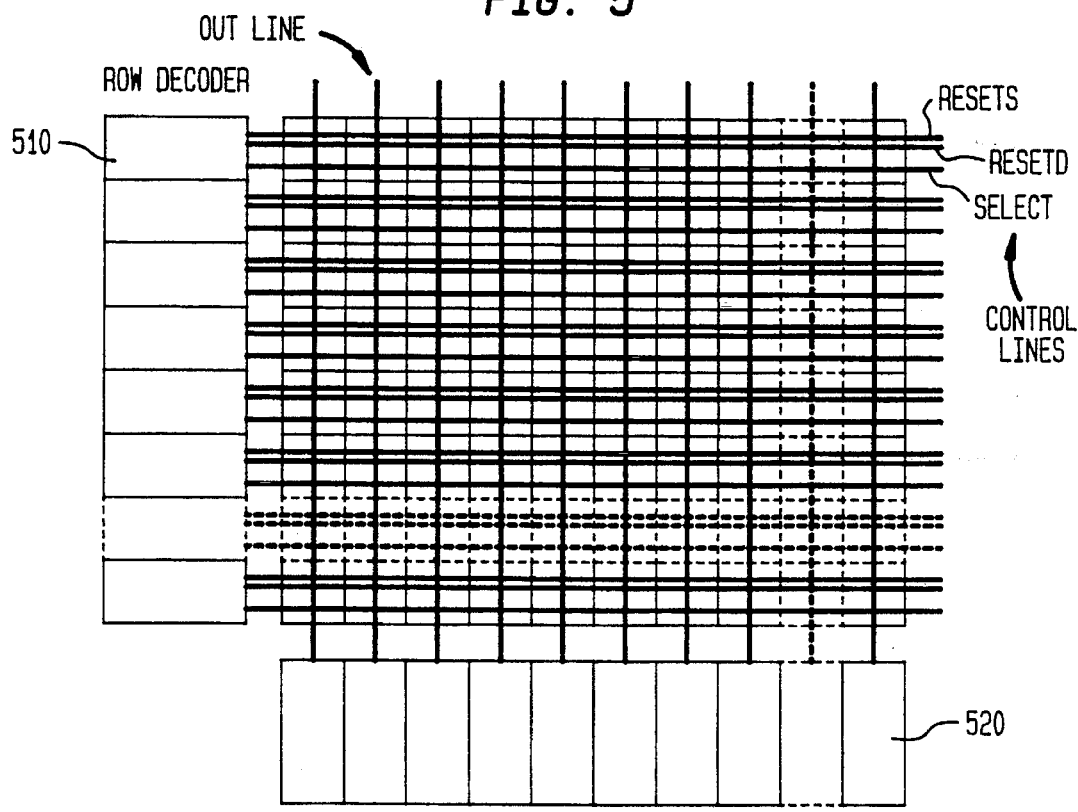
FIG. 5 illustrates an imaging array formed from rows and columns of imaging active pixels as in FIG. 3.

FIG. 5 shows an imaging array formed from rows and columns of imaging pixels as in FIG. 3. Row Decoder 510 provides Horizontal Reset D, Reset S, and Select lines, which are commonly connected across each row to provide control signals to the imaging pixels. The vertical OUT line of each imaging pixel of each column are commonly connected to carry pixel video outputs to amplifiers 520 for signal amplification prior to video processing. The circuitry of the row decoder 510 and amplifiers 520 are well known to one skilled in the art.

It is readily apparent to one skilled in the art that the transfer gate TG of FIG. 3 can be eliminated, hence simplifying the design. However, an added implant step is required. This implant should be disposed in the displaced TG area. The implant is such that the surface potential of the transfer channel is pinned at a level that makes it slightly conducting. This implanted area would constitute a virtual transfer gate.

Therefore, it is understood that what has been described is merely illustrative of the principals of the present invention and that other arrangements, modifications and methods can be readily made by those skilled in the art without departing from the spirit and scope of the present invention.

What is claimed is:

1. An imaging pixel having non-destructive read out, comprising:

a first charge collection device configured for collecting photo-charges at a level proportional to energy received from a portion of an object to be imaged;

a second charge collection device, being operatively connected to said first charge signal collection device and configured for selectively receiving and collecting said photo-charges from said first charge collection device; and a gating device being operatively connected to said second charge collection device, for selectively reading the level of said photo-charges collected in said second charge collection device without destructing the collected photo-charges.

2. The imaging pixel device according to claim 1, further including means for selectively transferring said collected charges between said first and second charge collection devices.

3. The imaging pixel device according to claim 1, wherein said gating device includes transistors connected in a source follower format.

4. The imaging pixel device according to claim 1, wherein said gating device is further configured to commonly connect to at least one other gating device external to said imaging pixel for reading out from other imaging pixels disposed externally to said imaging pixel.

5. The imaging pixel device according to claim 1, further including a reverse-biased semiconductive junction, being operatively connected to at least one of said first and second charge signal collection devices, for selectively discharging said collected photo-charges.

6. The imaging pixel device according to claim 5, wherein said semiconductive junction is buried and vertically disposed adjacent to at least one of said first and second charge collection devices.

7. The imaging pixel device according to claim 6 wherein said buried semiconductive junction is formed from an n-type substrate with a p-type epitaxial layer.

8. The imaging pixel device according to claim 5, wherein said semiconductive junction is p-n type and is disposed horizontally adjacent said first charge collection device.

9. An imaging pixel device for imaging a portion of an object, comprising:

collection means for collecting energy reflected from said portion of said object;

storage means, operatively coupled to said collection means for storing said collected energy;

output means coupled to said storage means, for selectively reading a potential value corresponding to said collected energy and for buffering said storage means: and transferring means for selectively transferring said collected energy between said collection means and said storage means without destructing said collected energy for repeat read-outs.

10. The imaging pixel device according to claim 9, where said transferring means includes two transistors which are commonly connected and control the amount of collected energy transferred from said collection means to said storage means.

11. The imaging pixel device according to claim 9, wherein said output means includes transistors connected in a source follower format.

12. The imaging pixel device according to claim 11, wherein said transistors are CMOS.

13. The imaging pixel device according to claim 9, further including means for discharging said collected energy.

14. The imaging pixel device according to claim 13, wherein said means for discharging includes a reverse-biased semiconductive junction.

15. A method for imaging from an imaging pixel device, comprising the steps of:

detecting energy reflected from an object to be imaged by a photo-detecting device;

generating photo-charges in an amount corresponding to said detected energy;

transferring said photo-charges to and from said photo-detecting device and a read-out storage device up to a plurality of times without destructing the photo-charges;

buffering said read-out storage device from an output gate; and outputting from said output gate a potential value corresponding to the amount of photo-charges stored in said read-out storage device.

16. The method according to claim 15, further including the step of discharging said generated photo-charges with a reverse biased semiconductive junction.

17. The method according to claim 15, wherein said outputting step further includes the steps of:

comparing said potential to a predetermined potential criterion;

transferring said photo-charges to said photo-detecting device upon failure of said criterion;

further generating photo-charges;

transferring photo-charges collected in said photo-detecting device to said read-out storage device; and outputting a potential corresponding to said photo-charges in said storage device.

* * * * *